(12) United States Patent
Li et al.

(10) Patent No.: US 11,738,761 B2
(45) Date of Patent: Aug. 29, 2023

(54) METHOD AND DEVICE FOR MONITORING DRIVING BEHAVIOR RISK DEGREE (71) Applicant: SHENZHEN UNIVERSITY, Shenzhen (CN)

(72) Inventors: Guofa Li, Shenzhen (CN); Yifan Yang, Shenzhen (CN); Shenglong Li, Shenzhen (CN); Weijian Lai, Shenzhen (CN); Yaoyu Chen, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 16/626,566

(22) PCT Filed: Nov. 25, 2019

(86) PCT No.: PCT/CN2019/120565
§ 371 (c)(1),
(2) Date: Dec. 26, 2019

(87) PCT Pub. No.: WO2021/093013
PCT Pub. Date: May 20, 2021

(65) Prior Publication Data
US 2022/0266842 A1     Aug. 25, 2022

(30) Foreign Application Priority Data

Nov. 12, 2019   (CN) .......................... 201911099408.8

(51) Int. Cl.
*B60W 30/095*     (2012.01)
*B60W 50/00*      (2006.01)
(Continued)

(52) U.S. Cl.
CPC ........ *B60W 50/0097* (2013.01); *B60W 40/04* (2013.01); *B60W 40/105* (2013.01);
(Continued)

(58) Field of Classification Search
CPC ............ B60W 50/0097; B60W 40/04; B60W 40/105; B60W 40/12; B60W 50/0098;
(Continued)

(56) References Cited

U.S. PATENT DOCUMENTS

2008/0097699 A1* 4/2008 Ono .................... B62D 15/0265
                                                                701/300
2013/0179047 A1* 7/2013 Miller .................. B60W 30/09
                                                                701/70
(Continued)

FOREIGN PATENT DOCUMENTS

CN       104134370 A     11/2014
CN       106428001 A      2/2017
(Continued)

*Primary Examiner* — Hunter B Lonsberry
*Assistant Examiner* — Daniel M. Robert
(74) *Attorney, Agent, or Firm* — Robert L. Stearns; Dickinson Wright PLLC (57) ABSTRACT

The present disclosure discloses a method for monitoring driving behavior risk degree, including: acquiring first vehicle size information of a first vehicle, second vehicle size information of a second vehicle, vehicle driving information and vehicle driving environment information; determining the number of overlapping regions of the first vehicle and the second vehicle based on the first vehicle size information, the second vehicle size information and the vehicle driving information; and determining risk degree information of driving behavior based on the number of overlapping regions, the vehicle driving information and the vehicle driving environment information. This method may be applied in multiple scenarios, and facilitates drivers or passengers in avoiding them from traffic collision incidents, so that the safeties of the drivers and the passengers is greatly improved.

5 Claims, 7 Drawing Sheets

(51) Int. Cl.
*B60W 40/04* (2006.01)
*B60W 40/105* (2012.01)
*B60W 40/12* (2012.01)

(52) U.S. Cl.
CPC ........ *B60W 40/12* (2013.01); *B60W 50/0098* (2013.01); *B60W 2520/10* (2013.01); *B60W 2530/201* (2020.02); *B60W 2554/4042* (2020.02); *B60W 2554/802* (2020.02)

(58) Field of Classification Search
CPC ....... B60W 2520/10; B60W 2530/201; B60W 2554/4042; B60W 2554/802; B60W 30/095; B60W 40/06
See application file for complete search history.

(56) References Cited

U.S. PATENT DOCUMENTS

| | | | |
|---|---|---|---|
| 2014/0176714 A1 | 6/2014 | Li et al. | |
| 2016/0328974 A1* | 11/2016 | Yoshizawa | B60W 30/095 |
| 2017/0243518 A1* | 8/2017 | Kanemaru | G09B 5/065 |
| 2018/0099665 A1* | 4/2018 | You | G01S 13/931 |
| 2018/0259636 A1* | 9/2018 | Aoyagi | B60R 21/34 |
| 2018/0286242 A1* | 10/2018 | Talamonti | B62D 15/025 |
| 2018/0326979 A1* | 11/2018 | Tsuruoka | B60W 30/0956 |
| 2019/0061750 A1* | 2/2019 | Tamura | B60W 30/09 |
| 2019/0152490 A1* | 5/2019 | Lan | G06T 7/20 |
| 2019/0291726 A1* | 9/2019 | Shalev-Shwartz | B60W 30/0956 |
| 2019/0295179 A1* | 9/2019 | Shalev-Shwartz | G07C 5/02 |
| 2020/0363818 A1* | 11/2020 | Li | G05D 1/0289 |
| 2021/0229656 A1* | 7/2021 | Dax | B60W 30/0956 |
| 2022/0227367 A1* | 7/2022 | Kario | B60W 30/0956 |

FOREIGN PATENT DOCUMENTS

| | | | | |
|---|---|---|---|---|
| CN | 107346612 A | * | 11/2017 | ............ G08G 1/166 |
| CN | 108010388 A | * | 5/2018 | |
| CN | 108010388 A | | 5/2018 | |
| CN | 108216220 A | | 6/2018 | |
| CN | 108447308 A | | 8/2018 | |
| CN | 108806018 A | * | 11/2018 | ........... G07C 5/0808 |
| CN | 108806018 A | | 11/2018 | |
| CN | 109191487 A | | 1/2019 | |
| CN | 109308816 A | | 2/2019 | |
| CN | 110065494 A | * | 7/2019 | ........ B60W 30/0953 |
| CN | 110065494 A | | 7/2019 | |
| JP | 2014232509 A | | 12/2014 | |
| WO | 2016199345 A1 | | 12/2016 | |

* cited by examiner

METHOD AND DEVICE FOR MONITORING DRIVING BEHAVIOR RISK DEGREE

CROSS-REFERENCE TO RELATED APPLICATION

This application is the International Application No. PCT/CN2019/120565 for entry into US national phase, with an international filing date of Nov. 25, 2019, now pending, and claims priority to Chinese patent application No. 201911099408.8, filed on Nov. 12, 2019 and entitled "method and device for monitoring driving behavior risk degree", the content of which is incorporated herein by reference in its entirety.

TECHNICAL FIELD

The present disclosure relates to the technical field of driving safety, and more particularly to a method for monitoring driving behavior risk degree and a device for monitoring driving behavior risk degree.

BACKGROUND

The statement herein only provides background information related to the present disclosure without necessarily constituting the prior art. Driving is a basic traffic travelling manner, there is a certain danger in driving a vehicle, crossroads and some relevant regions are usually considered as places with higher traffic accident occurrence rate, this is because the traffic conditions are more complex in these regions and a driver needs to process more driving-related information, which causes the driver to make mistakes more easily. 47.7 percent of traffic accidents with injured passengers take place at the crossroad, and 96 percent of traffic accidents are caused by driving faults of drivers. The researches on driving behavior risk degrees are mainly focused on the risk degree evaluation in particular regions in the related art; however, these methods have different information requirements on sensing layers of intelligent vehicle, these requirements are difficult to be uniformly and effectively transferred, such that the driving behavior risk degrees of surrounding traffic participants in the driving process cannot be effectively evaluated.

Technical Problem

One of the objectives of the embodiments of the present disclosure is providing a method and device for monitoring driving behavior risk degree, which aims at solving a problem that the related technology has different information requirements on sensing layers of intelligent vehicle, and these requirements are difficult to be uniformly and effectively transferred, such that the driving behavior risk degrees of surrounding traffic participants in the driving process cannot be effectively evaluated.

Technical Solution

In order to solve the technical problem mentioned above, the technical solutions to be adopted by the embodiments of the present disclosure are as follows:

In the first aspect, the present disclosure provides a method for monitoring driving behavior risk degree, including:

acquiring first vehicle size information of a first vehicle, acquiring second vehicle size information of a second vehicle, and acquiring vehicle driving information and vehicle driving environment information, wherein the vehicle driving information comprises driving speed information of the first vehicle and driving speed information of the second vehicle;

determining the number of overlapping regions of the first vehicle and the second vehicle based on the first vehicle size information, the second vehicle size information and the vehicle driving information; and determining risk degree information of driving behavior based on the number of overlapping regions, the vehicle driving information and the vehicle driving environment information.

In the second aspect, the embodiments of the present disclosure provides a device for monitoring driving behavior risk degree, including a memory, a processor and computer program stored in the memory and executable by the processor, the processor is configured to, when executing the computer program, implement the method for monitoring driving behavior risk degree described in the first aspect.

In the third aspect, the embodiments of the present disclosure provides a computer readable storage medium which stores a computer program, wherein the computer program is configured to, when being executed by a processor, implement the method for monitoring driving behavior risk degree described in the first aspect.

In the fourth aspect, embodiments of the present disclosure provide a computer program product, when the computer program product is executed on a terminal device, the terminal device is caused to perform the method for monitoring driving behavior risk degree described in the first aspect.

Advantageous Effects

The advantageous effects of the method for monitoring driving behavior risk degree provided by the embodiments of the present disclosure are as follows: the first vehicle size information of the first vehicle, the second vehicle size information of the second vehicle, the vehicle driving information and the vehicle driving environment information are acquired; the number of overlapping regions of the first vehicle and the second vehicle is determined based on the first vehicle size information, the second vehicle size information and the vehicle driving information; the risk degree information of the driving behavior is determined based on the number of the overlapping regions, the vehicle driving information and the vehicle driving environment information. In the method for monitoring driving behavior risk degree as mentioned above, the vehicle collision problem is represented as a general collision problem in two-dimensional plane, the risk degree of the surrounding traffic participants is evaluated by acquiring dynamic information of the current user's own vehicle and the surrounding traffic participants and factors such as weather and road environment, and so on, this method may be applied in multiple scenarios such as intersections, entrances and exits, highways and the like, and facilitates drivers or passengers in avoiding them from the occurrence of traffic collision accidents, thereby greatly improving safeties of drivers and passengers.

BRIEF DESCRIPTION OF THE DRAWINGS

In order to explain the embodiments of the present disclosure more clearly, a brief introduction regarding the accompanying drawings that need to be used for describing

DESCRIPTION OF THE EMBODIMENTS

In order to make the objective, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

It should be noted that, when one component is described to be "fixed to" or "arranged on" another component, this component may be directly or indirectly arranged on another component. When one component is described to be "connected with" another component, it may be directly or indirectly connected to the other component. Orientation or position relationships indicated by terms including "upper", "lower", "left" and "right" are based on the orientation or position relationships shown in the accompanying figures and is only used for the convenience of description, instead of indicating or implying that the indicated device or element must have a specific orientation and is constructed and operated in a particular orientation, and thus should not be interpreted as limitation to the present disclosure. For the person of ordinary skill in the art, the specific meanings of the aforesaid terms may be interpreted according to specific conditions. Terms of "the first" and "the second" are only for the purpose of describing conveniently and should not be interpreted as indicating or implying relative importance or impliedly indicating the number of indicated technical features. "Multiple/a plurality of" means two or more unless there is an additional explicit and specific limitation.

In order to describe the technical solutions of the present disclosure, the present disclosure is described in detail with reference to the accompanying figures and the embodiments.

Figure 1:
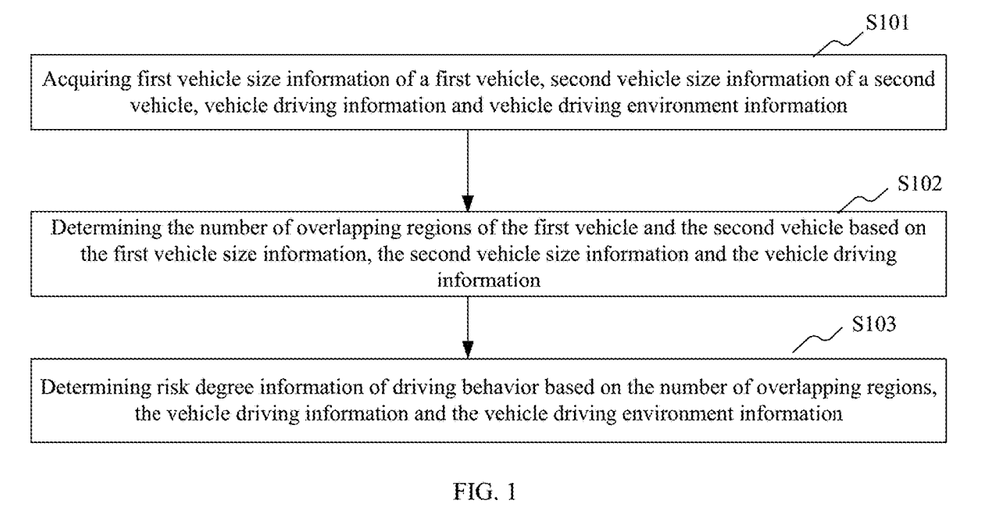
FIG. 1 depicts a schematic flow diagram of a method for monitoring driving behavior risk degree according to embodiment one of the present disclosure.

Referring to FIG. 1, FIG. 1 depicts a schematic flow diagram of a method for monitoring a driving behavior risk degree provided by the first embodiment of the present disclosure. The executive subject of the method for monitoring driving behavior risk degree in this embodiment is a device having a driving behavior risk degree monitoring function, which may be a mobile terminal, a server and the like. The method for monitoring the driving behavior risk degree as shown in FIG. 1 may include:

Step 101: acquiring first vehicle size information of a first vehicle, acquiring second vehicle size information of a second vehicle, and acquiring vehicle driving information and vehicle driving environment information, where the vehicle driving information includes driving speed information of the first vehicle and driving speed information of the second vehicle.

The first vehicle size information of the first vehicle, the second vehicle size information of the second vehicle, the vehicle driving information and the vehicle driving environment information are acquired by this device; where the first vehicle is the vehicle driven by the current user, and the second vehicle is other traffic participant. In the actual driving process, there may be a plurality of traffic participants, however, the number of the second vehicle in the embodiment is 1, and risk degree information of each of traffic participants may be determined sequentially according to the technical solution in this embodiment. The first vehicle size information of the first vehicle and the second vehicle size information of the second vehicle may be pre-stored in this device, the vehicle size information may include the length, the width and the height of the vehicle. The vehicle driving information includes driving speed information of the first vehicle and driving speed information of the second vehicle. It may be understood that the vehicle driving information may also include other parameters such as acceleration information of vehicle driving acceleration information as needed. The vehicle driving environment information may include driving environment weather information and driving environment road condition information, the driving environment weather information may include sunny weather, foggy weather, rainy weather, and dusty weather, and the driving environment road condition information may include normal road, wetness and slippery road and snowy road. Different driving environment information of the vehicle may affect driving parameters of the vehicle such as deceleration speed, when the vehicle is stopped by braking.

S102: determining the number of overlapping regions of the first vehicle and the second vehicle based on the first vehicle size information, the second vehicle size information and the vehicle driving information.

Figure 2:
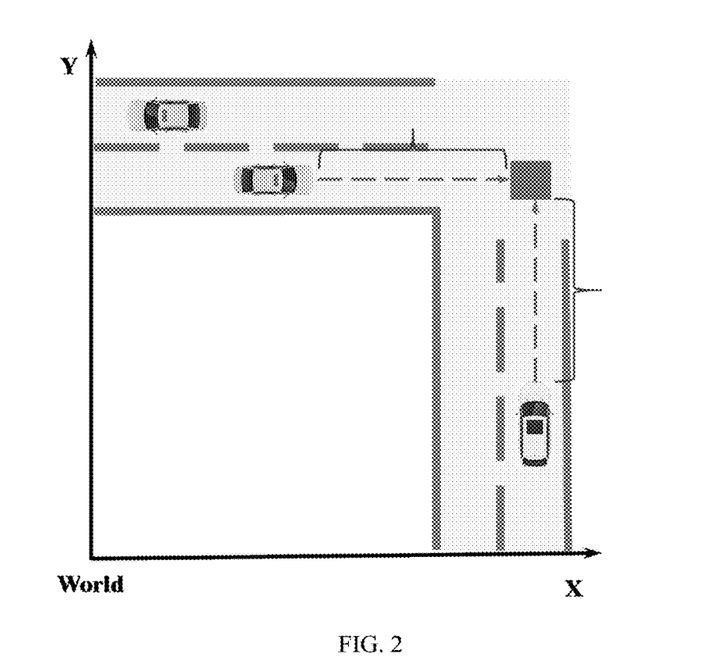
FIG. 2 depicts a schematic diagram of locations of a first vehicle and a second vehicle provided by embodiment one of the present disclosure, when the number of overlapping regions is 0.
Figure 3:
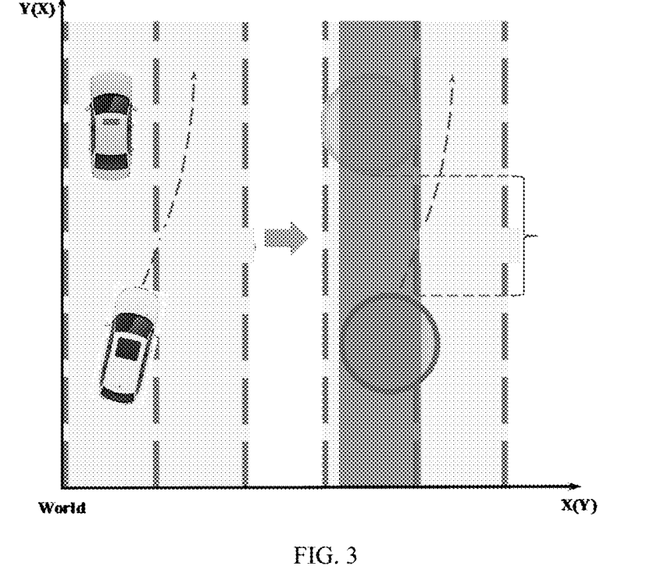
FIG. 3 depicts a schematic diagram of locations of the first vehicle and the second vehicle provided by embodiment one of the present disclosure, when the number of overlapping regions is 1.
Figure 4:
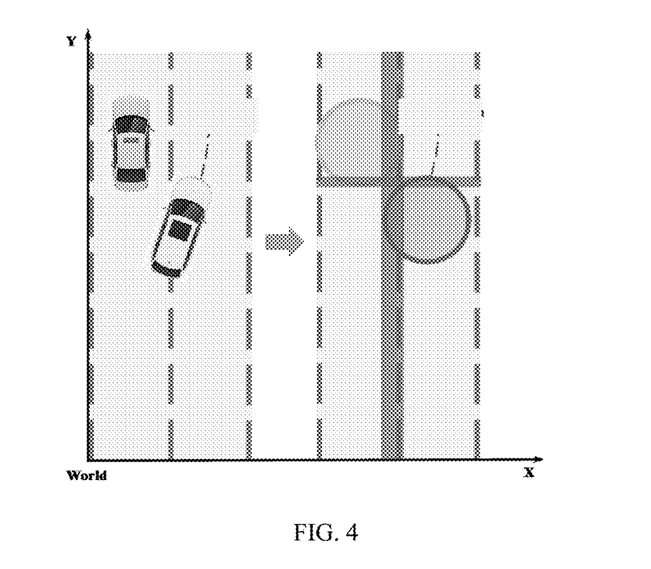
FIG. 4 depicts a schematic diagram of locations of the first vehicle and the second vehicle provided by embodiment one of the present disclosure, when the number of overlapping regions is 2.

An overlapping region determination strategy is preset in the device, the overlapping region determination strategy is configured to determine whether there exists an overlapping region between the first vehicle and the second vehicle, and the overlapping region may be an infinitely-great overlapped region formed by the first vehicle and the second vehicle in the horizontal and vertical directions of a two-dimensional plane. The vehicle driving information includes the current driving location information of the vehicle, the device determines whether there exists an overlapping region between the first vehicle and the second vehicle based on the first vehicle size information, the second vehicle size information, the vehicle driving information and the overlapping region determination strategy so as to determine whether there exists the overlapping region between the first vehicle and the second vehicle, and acquire the number of overlapping regions if there exists the overlapping region. The number of the overlapping regions may be one selected from the group of 0, 1, 2. When the number information of the overlapped regions is 0, as shown in FIG. 2, the first vehicle and the second vehicle do not share overlapping region on the X axis and an the Y axis; when the number information of the overlapping regions is 1, as shown in FIG. 3, there is an overlapping region of the first vehicle and the second vehicle on the X axis or there is an overlapping region of the first vehicle and the second vehicle on the Y axis; when the number information of the overlapping regions is 2, as shown in FIG. 4, the first vehicle and the second vehicle have an overlapping region on the X axis, and the first vehicle and the second vehicle have an overlapping region on the Y axis.

S103, determining the risk degree information of the driving behavior based on the number of overlapping regions, the vehicle driving information and the vehicle driving environment information.

The risk degree information of the driving behavior is determined by the device based on the number of overlapping regions, the vehicle driving information and the vehicle driving environment information. Where the number of overlapping regions, the vehicle driving information and the vehicle driving environment information are necessary parameters for determining the risk degree information of the driving behavior, and the strategy of determining the risk degree information of driving behavior may be acquired according to the number of overlapping regions, the vehicle driving information and the vehicle driving environment information, and the risk degree information of the driving behavior is determined accordingly.

In this embodiment of the present disclosure, the first vehicle size information of the first vehicle, the second vehicle size information of the second vehicle, the vehicle driving information and the vehicle driving environment information are acquired; the number of overlapping regions of the first vehicle and the second vehicle is determined based on the first vehicle size information, the second vehicle size information and the vehicle driving information; the risk degree information of the driving behavior is determined based on the number of the overlapping regions, the vehicle driving information and the vehicle driving environment information. In the method for monitoring driving behavior risk degree as mentioned above, the vehicle collision problem is represented as a general collision problem in two-dimensional plane, the risk degree of the surrounding traffic participants is evaluated by acquiring dynamic information of the current user's own vehicle and the surrounding traffic participants and factors such as weather and road environment, and so on, this method may be applied in multiple scenarios such as intersections, entrances and exits, highways and the like, and facilitates drivers or passengers in avoiding them from the occurrence of traffic collision accidents, thereby greatly improving safeties of drivers and passengers.

Figure 5:
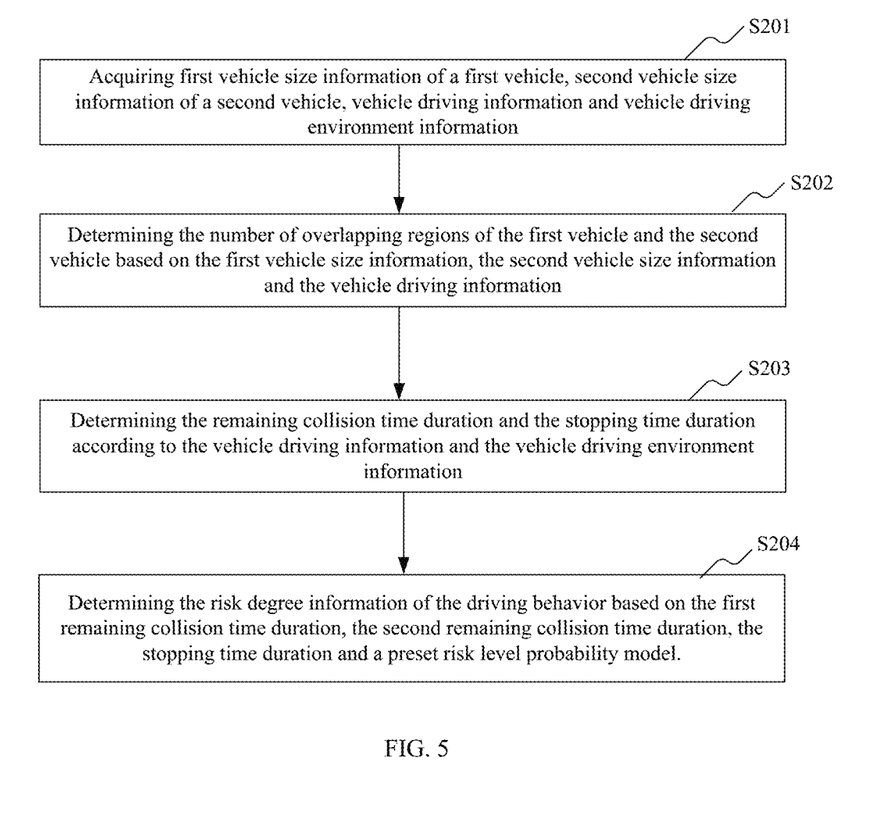
FIG. 5 depicts a schematic flow diagram of another method for monitoring driving behavior risk degree according to embodiment two of the present disclosure.

Referring to FIG. 5, FIG. 5 depicts a schematic flow diagram of another method for monitoring driving behavior risk degree according to the second embodiment of the present disclosure. The executive subject of the method for monitoring driving behavior risk degree in this embodiment is a device having a driving behavior risk degree monitoring function, which may be a mobile terminal, a server and the like. In order to accurately determine the risk degree information of the driving behavior when the number of overlapping regions is 0, the difference between this embodiment and the first embodiment is embodied in steps 203-204, where the steps 201-202 in this embodiment is the same as the steps 101-102 in the first embodiment, the steps 203-204 are the further detailed descriptions of step 103, as shown in FIG. 5, the steps 203-204 are specifically as follows:

S203: determining a remaining collision time duration and a stopping time duration based on the vehicle driving information and the vehicle driving environment information; where the remaining collision time duration is the remaining time duration lasting from the current moment to a time point when the first vehicle collides with the second vehicle; the remaining collision time duration includes a first remaining collision time duration in the X-axis direction and a second remaining collision time duration in the Y-axis direction; and the stopping time duration is the time duration lasting from the current moment to a moment when the first vehicle stops driving.

The remaining collision time duration and the stopping time are determined by this device based on the vehicle driving information and the vehicle driving environment information. Where the remaining collision time duration is the remaining time duration lasting from the current moment to a time point when the first vehicle collides with the second vehicle, the remaining collision time duration includes a first remaining collision time duration in the X-axis direction and a second remaining collision time duration in the Y-axis direction, and the remaining collision time duration may be determined by this device according to the vehicle driving information. In particular, the remaining collision time duration may be determined according to the driving speed information of the first vehicle, the driving speed information of the second vehicle, the current location information of the first vehicle and the current location information of the second vehicle, the remaining collision time duration may be calculated according to the formula listed as follows:

$$TTC = \frac{p_j(t) - p_i(t)}{v_i(t) - v_j(t)}$$

$$i = \operatorname{argmax}(v_{hv}(t), v_{o_j}(t)), i \in \{hv, o_j\}$$

$$j = \operatorname{argmin}(v_{hv}(t), v_{o_j}(t)), j \in \{hv, o_j\}$$

Where, TTC represents the remaining collision time duration, p represents the current location information, v represents driving speed information, Av represents the first vehicle, $o_j$ represents the second vehicle, t represents the current moment, j represents an index of other traffic participants.

Where, the stopping time duration represents the time duration lasting from the current moment to a moment when the first vehicle stops driving, that is, the time duration required for stopping the first vehicle at a designated deceleration speed. The weather condition affects an observation range of a driver or a sensor, a greater vehicle interval is needed under the severe weather, the greater vehicle interval is equivalent to longer stopping time duration, thus, the driving environment weather information in the vehicle driving environment information is a necessary parameter for calculating the stopping time duration, too. The stopping time duration may be calculated by the formula listed as follows:

$$TTS_{a_i}(v_{hv}(t), w_s) = \left\{ t \middle| w_s \frac{v_{hv}(t)}{a}, i \in \{e, a, c\} \right\}$$

$$s \in \{\text{clear, fog, rain, dust}\} = \{c, f, r, d\}$$

$$w_s = \{c : 1, f : 1.4, r : 1.2, d : 1.3\}$$

where TTS represents the stopping time duration, s represents driving environment weather information, clear, fog, rain, dust represents that the driving environment weather information are sunny weather, foggy weather, rainy weather and dusty weather, respectively, $w_s$ represents coefficients corresponding to different driving environment weather information, a represents deceleration information.

The deceleration information may be directly acquired by the device or be acquired by the device by calculation. For the comfort of passengers, different degrees of decelerations are considered to balance the braking capacity and the comfort of passengers better. For convenience, three different decelerations are defined to balance the maximum vehicle braking capacity and the passenger comfort level. The three deceleration threshold values represent the following meanings: 1) the maximum braking deceleration; 2) the normal braking deceleration; and 3) deceleration which makes the passengers be comfortable. Meanwhile, the road condition may affect the three decelerations as mentioned above, and the road conditions to be considered are as follows: normal n; wetness w; snow s; the deceleration information may be expressed by the formula listed as follows:

$$a_{thresh}(r_s) = \{a|r_s a_e, r_s a_a, r_s a_c\}$$

$$s \in \{\text{normal,wetness,snow}\} = \{n, w, s\}$$

$$r_s = \{n: 1, w: 0.83, s: 0.67\}$$

where $a_{thresh}(r_s)$ represents deceleration information, s represents different driving environment road condition information, $r_s$ represents coefficients corresponding to different driving environment road condition information.

The risk degree information of driving behavior is determined by this device based on the first remaining collision time duration, the second remaining collision time duration, the stopping time duration and a preset risk level probability model. Where the first remaining collision time duration, the second remaining collision time duration, the stopping time duration are necessary parameters for determining the risk degree information of driving behavior, the strategy of determining the risk degree information of driving behavior may be acquired according to the first collision time duration, the second remaining collision time duration, the stopping time duration and the preset risk level probability model, and the risk degree information of driving behavior is determined accordingly.

Figure 6:
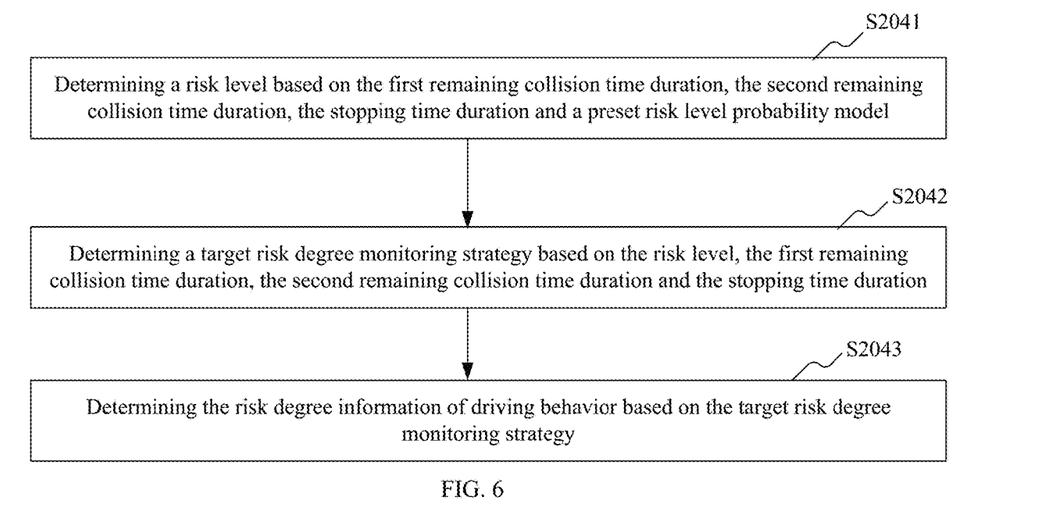
FIG. 6 depicts a schematic flow diagram of the details of step 204 in the method for monitoring driving behavior risk degree according to embodiment two of the present disclosure.

In one embodiment, in order to accurately acquire the risk information, the step 204 may include steps 2041-2043, as shown in FIG. 6, and the steps 2041-2043 are specifically described as follows:

S2041: determining the risk level based on the first remaining collision time duration, the second remaining collision time duration, the stopping time duration and a preset risk level probability model.

The risk level based on the first remaining collision time duration, the second remaining collision time duration, a stopping time duration and the preset risk level probability model are determined by this device, where the risk level includes a dangerous state, an attention reminding state and a safe state. In this embodiment, the risk level includes: 1) dangerous, 2) attention reminding, 3) safe, and are expressed by the formula listed as follows:

$$\tau \in \{\text{Dangerous,Attentive,Safe}\} = \{D, A, S\}$$

The risk level is merely a preliminary estimation of the current situation, which risk level the current situation falls within is estimated, and the risk level may be interpreted as acquiring a prior probability. The preset risk level probability model in this embodiment is configured to acquire the prior probability which is equivalent to the condition probability in the bayesian probability model.

In one embodiment, in order to determine the risk level more accurately, step 2041 may include step 2041a, and step 2041b or step 2011c, where the step 2041a, the step 2041b and the step 2041c have an alternative relationship and are alternatively selected to be performed, step 2041a, step 2041b, step 2041c are particularly described as follows:

S2041a: determining the risk level as a dangerous state, when the absolute value of the difference between the first remaining collision time duration and the second remaining collision time duration is less than a preset threshold value.

Whether the absolute value of the difference value between the first remaining collision time duration and the second remaining collision time duration is less than the preset threshold value is determined by this device, when the absolute value of the difference value between the first remaining collision time duration and the second remaining collision time duration is less than the preset threshold value, it indicates that a more powerful braking capability is needed for preventing collision from occurring at this moment, the current braking capability is too weak to prevent collision from occurring; thus, the risk level is determined as the dangerous state.

S2041: determining the risk level as the safe state, when the absolute value of the difference value between the first remaining collision time duration and the second remaining collision time duration is greater than or equal to the preset threshold value.

Whether the absolute value of the difference value between the first remaining collision time duration and the second remaining collision time duration is less than the preset threshold value is determined by this device, when the absolute value of the difference value between the first remaining collision time duration and the second remaining collision time duration is greater than or equal to the preset threshold value, it indicates that the difference value between the first remaining collision time duration and the second remaining collision time duration is greater, thus, the risk level is determined as the safe state.

S2041c: determining the risk level based on the preset risk level probability model, when the absolute value of the difference value between the first remaining collision time duration and the second remaining collision time duration is greater than the preset threshold value or the remaining collision time duration is greater than the stopping time duration.

Whether the absolute value of the difference value between the first remaining collision time duration and the second remaining collision time duration is less than the preset threshold value is determined by this device; the risk level is determined based on the preset risk level probability model, when the absolute value of the difference value between the first remaining collision time duration and the second remaining collision time duration is greater than the preset threshold value or the remaining collision time duration is greater than the stopping time duration.

S2042: determining a target risk degree monitoring strategy based on the risk level, the first remaining collision time duration, the second remaining collision time duration and the stopping time duration.

Different risk levels correspond to different risk degree monitoring strategies, for example, the risk level which indicates the dangerous state and the risk level which indicates the safe state have different risk levels and different parameters that influence the risk level information, and consequently, the risk degree monitoring strategies are certainly different.

In this embodiment, the same risk level is further distinguished by different conditions, the risk degree monitoring strategies corresponding to the various risk levels under different conditions are preset in this device. In particular, regarding the risk degree monitoring strategies corresponding to the various risk levels under different conditions, reference can be made to the formulas listed as follows:

$$s_{o_j}(TTC_{o_j}, v_{hv}(t)|\tau = D) \propto \begin{cases} 1, & \text{if } TTC_{o_j} \leq TTS_{a_e} \\ e^{-\frac{(TTC_{o_j}-TTS_{a_e})^2}{2\sigma^2}}, & \text{otherwise} \end{cases}$$

$$s_{o_j}(TTC_{o_j}, v_{hv}(t)|\tau = D = A) \propto e^{-\frac{(TTC_{o_j}-TTS_{a_e})^2}{2\sigma^2}}$$

$$s_{o_j}(TTC_{o_j}, v_{hv}(t)|\tau = D) \propto \begin{cases} e^{-\frac{(TTC_{o_j}-TTS_{a_e})^2}{2\sigma^2}}, & \text{if } TTC_{o_j} \leq TTS_{a_e} \\ 1, & \text{otherwise} \end{cases}$$

$$TTC_{o_j} = \max(TTC_{o_j}^x, TTC_{o_j}^y), \forall j = 1, 2, \ldots, N$$

$$\text{s.t. } \neg \left(\left|TTC_{o_j}^x - TTC_{o_j}^y\right| > TTS_{a_c} \text{ or } TTC_{o_j}^{x(y)} > TTS_{a_c}(v_{hv}^{x(y)}(t))\right)$$

$$s_{o_j}(TTC_{o_j}, v_{hv}(t)|\tau = D) \propto 0$$

$$s_{o_j}(TTC_{o_j}, v_{hv}(t)|\tau = A) \propto 0$$

$$s_{o_j}(TTC_{o_j}, v_{hv}(t)|\tau = S) \propto 1$$

$$TTC_{o_j} = \min(TTC_{o_j}^x, TTC_{o_j}^y), \forall j = 1, 2, \ldots, N$$

$$\text{s.t. } \left(\left|TTC_{o_j}^x - TTC_{o_j}^y\right| > TTS_{a_c} \text{ or } TTC_{o_j}^{x(y)} > TTS_{a_c}(v_{hv}^{x(y)}(t))\right)$$

Where, $s_{o_j}$ represents risk degree information of risk behavior, HV identifies the first vehicle, $o_j$ identifies the second vehicle, $TTC_{o_j}^x$ represents the first remaining collision time duration, $TTC_{o_j}^y$ represents the second remaining collision time duration, $v_{hv}(t)$ represents the current speed of the first vehicle, $\tau$ represents the risk level, D identifies the risk level as the dangerous state, A identifies the risk level as the attention reminding state, S identifies the risk level as the safe state, and the condition of ($|TTC_{o_j}^x-TTC_{o_j}^y|>TTS_{a_c}$ or $TTC_{o_j}^{x(y)}>TTS_{a_c}(v_{hv}^{x(y)}(t))$) represents when the absolute value of the difference value between the first remaining collision time duration and the second remaining collision time duration is greater than a preset threshold value or the remaining collision time duration is greater than the stopping time duration.

Step 2043: determining the risk degree information of driving behavior based on the target risk degree monitoring strategy.

The risk degree information of driving behavior is acquired by this device by calculation based on the target risk degree monitoring strategy and the parameters that are required in the target risk degree monitoring strategy after the target risk degree monitoring strategy is determined by this device.

Figure 7:
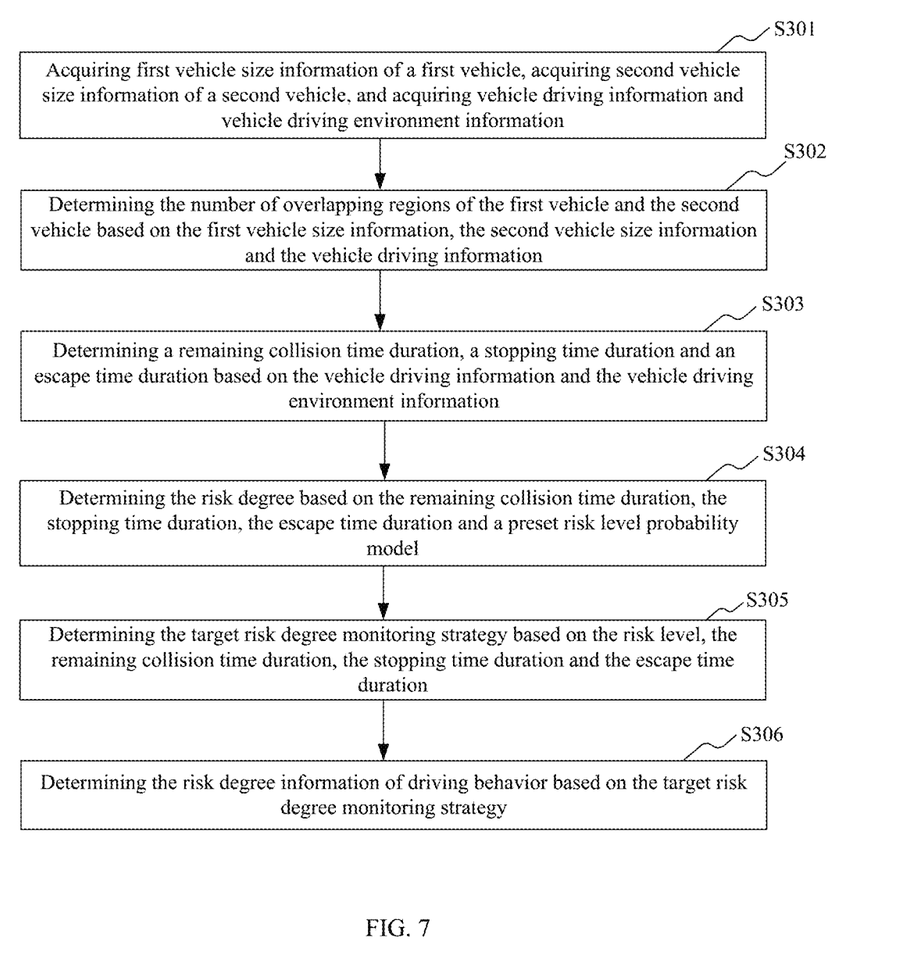
FIG. 7 depicts a schematic flow diagram of another method for monitoring driving behavior risk degree according to the third embodiment of the present disclosure.

Referring to FIG. 7, FIG. 7 depicts a schematic flow diagram of another method for monitoring driving behavior risk degree provided by the third embodiment of the present disclosure. The executive subject of the method for monitoring driving behavior risk degree in this embodiment is a device having a driving behavior risk degree monitoring function, which may be a mobile terminal, a server and the like. When the number of the overlapping regions is 1, in order to accurately determine the risk information of the driving behavior, the difference between this embodiment and the first embodiment is embodied in steps 303-306, where the steps 301-302 in this embodiment are the same as the steps 101-102 in the first embodiment, steps 303-306 are further explanation of step 103, as shown in FIG. 6, steps 303-306 are described in detail as follows:

Step 303: determining a remaining collision time duration, a stopping time duration and an escape time duration based on vehicle driving information and vehicle driving environment information, where the escape time duration is the time duration lasting from the current time to the target moment, and the target moment is the moment when the overlapping region between the first vehicle and the second vehicle disappears.

In the step 303, regarding the details of determining the remaining collision time duration and the stopping time duration based on the vehicle driving information and the vehicle driving environment information, reference can be made to the relevant descriptions in the step 203, and the details are not repeatedly described herein.

An escape time duration is determined by this device based on the vehicle driving information and the vehicle driving environment information, the escape time duration is the time duration between the current moment and the target moment, the target moment is the moment when the overlapping regions between the first vehicle and the second vehicle disappears, and the escape time duration may be calculated by the formula listed as follows:

$$TTE_{o_j}^{x(y)} = \frac{p_i^{x(y)}(t) - p_j^{x(y)}(t) + l}{v_j^{x(y)}(t) - v_i^{x(y)}(t)}$$

where, l represents a half of the sum of the lengths of the first vehicle and the second vehicle, $p^{x(y)}(t)$ represents location information in the X direction or in the Y direction, $v^{x(y)}(t)$ represents velocity in the X direction or in the Y direction.

S304: determining the risk level based on the remaining collision time duration, the stopping time duration, the escape time duration and the preset risk level probability model.

The risk level is determined by this device based on the remaining collision time duration, the stopping time duration, the escape time duration and the preset risk level probability model, where the risk level includes a dangerous state, and an attention reminding state and a safe state. In this embodiment, the risk level includes: 1) dangerous, 2) attention reminding, 3) safe, which are expressed by the formula listed as follows:

$$\tau \in \{\text{Dangerous}, \text{Attentive}, \text{Safe}\} = \{D, A, S\}$$

The risk level is merely a preliminary estimation of the current situation, which risk level the current situation falls within is estimated, and the risk level may be interpreted as acquiring a prior probability. The preset risk level probability model in this embodiment is configured to acquire the prior probability which is equivalent to the condition probability in the bayesian probability model.

In one embodiment, in order to more accurately determine the risk level, step 304 may include step 3041 or step 3042, where step 3041 and step 3042 have an alternative relationship, and are alternatively executed; step 3041 and step 3042 are described as follows:

S3041: determining the risk level as the safe state, when the escape time duration is greater than or equal to the remaining collision time duration.

The value of the escape time duration and the value of the remaining collision time duration are judged by this device, when the escape time duration is greater than or equal to the duration of the remaining collision time duration, it indicates that it is possible to escape before collision, so that the risk level is determined as the safe state.

S3042: determining the risk level based on a preset risk level probability model when the escape time duration is less than the remaining collision time duration.

The value of the escape time duration and the value of the remaining collision time duration are judged by this device, the risk level is determined based on the preset risk level probability model when the escape time duration is less than the remaining collision time duration.

S305: determining the target risk degree monitoring strategy based on the risk level, the remaining collision time duration, the stopping time duration and the escape time duration.

Different risk levels correspond to different risk degree monitoring strategies, for example, the risk level indicating the dangerous state and the risk level indicating the safe state have different risk levels and different parameters that influence the risk level information, consequently, the risk degree monitoring strategies are certainly different.

In this embodiment, the same risk level is further distinguished by different conditions, the risk degree monitoring strategies corresponding to the various risk levels under different conditions are preset in this device. Particularly, regarding the risk degree monitoring strategies corresponding to the various risk levels under different conditions, reference can be made to the formulas listed as follows:

$$s_{o_j}\left(TTC_{o_j}^{x(y)}, v_{hv}^{x(y)}(t)|\tau = D\right) \propto \begin{cases} 1, & \text{if } TTC_{o_j}^{x(y)} \leq TTS_{a_e} \\ e^{-\frac{\left(TTC_{o_j}^{x(y)} - TTS_{a_e}\right)^2}{2\sigma^2}}, & \text{otherwise} \end{cases}$$

$$s_{o_j}\left(TTC_{o_j}^{x(y)}, v_{hv}^{x(y)}(t)|\tau = A\right) \propto e^{-\frac{\left(TTC_{o_j}^{x(y)} - TTS_{a_e}\right)^2}{2\sigma^2}}$$

$$s_{o_j}\left(TTC_{o_j}^{x(y)}, v_{hv}^{x(y)}(t)|\tau = S\right) \propto \begin{cases} e^{-\frac{\left(TTC_{o_j}^{x(y)} - TTS_{a_e}\right)^2}{2\sigma^2}}, & \text{if } TTC_{o_j}^{x(y)} \leq TTS_{a_e} \\ 1, & \text{otherwise} \end{cases}$$

s.t. $TTE_{o_j}^{y(x)} \geq TTC_{o_j}^{x(y)}$ $s_{o_j}\left(TTC_{o_j}, v_{hv}(t)|\tau = D\right) \propto 0$ $s_{o_j}\left(TTC_{o_j}, v_{hv}(t)|\tau = A\right) \propto 0$ $s_{o_j}\left(TTC_{o_j}, v_{hv}(t)|\tau = S\right) \propto 1$ s.t. $TTE_{o_j}^{y(x)} < TTC_{o_j}^{x(y)}$ Where, $s_{o_j}$ represents risk degree information of risk behavior, HV identifies the first vehicle, $o_j$ identifies the second vehicle, $TTC_{o_j}^x$ represents the first remaining collision time duration, $TTC_{o_j}^y$ represents the second remaining collision time duration, $v_{hv}(t)$ represents the current speed of the first vehicle, $\tau$ represents the risk level, D identifies the risk level as the dangerous state, A identifies the risk level as the attention reminding state, S identifies the risk level as the safe state, and a restrictive condition of $TTE_{o_j}^{y(x)} < TTC_{o_j}^{x(y)}$ represents that the first vehicle may leave the overlapping region before collision.

S306, determining the risk degree information of driving behavior based on the target risk degree monitoring strategy.

Regarding the step 306, reference can be made to the relevant descriptions in step 2043, the step 306 is not repeatedly described herein.

Figure 8:
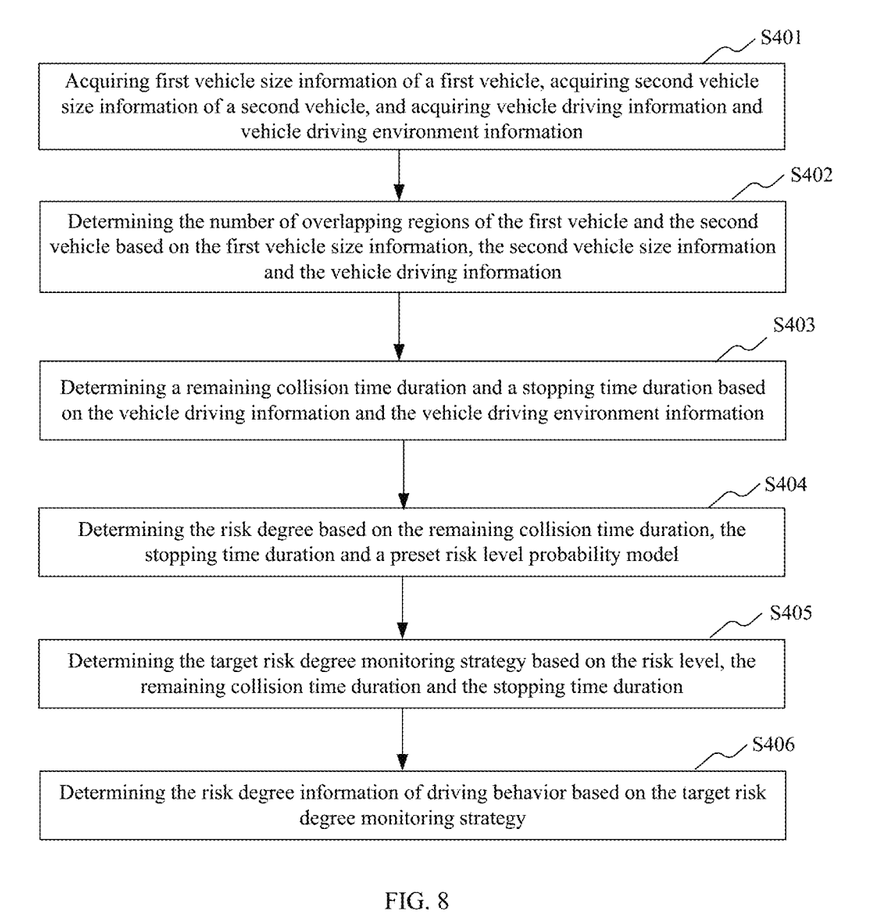
FIG. 8 depicts a schematic flow diagram of another method for monitoring driving behavior risk degree according to the fourth embodiment of the present disclosure.

Please refer to FIG. 8, FIG. 8 depicts a schematic flow diagram of another method for monitoring driving behavior risk degree provided by the fourth embodiment of the present disclosure. The executive subject of the method for monitoring the driving behavior risk degree in this embodiment is a device having a driving behavior risk degree monitoring function, and this device may be a mobile terminal, a server and the like. When the number of the overlapping regions is 2, the difference between this embodiment and the first embodiment is embodied in steps 403-406. Steps 401-402 in this embodiment are the same as the steps 101-102 in the first embodiment, and steps 403-406 are further explanations of step 103, as shown in FIG. 8, steps 403-406 are described in detail as follows:

S403, determining the remaining collision time duration and the stopping time duration based on vehicle driving information and vehicle driving environment information.

In the step 403, regarding the details of determining the remaining collision time duration and the stopping time duration based on the vehicle driving information and the vehicle driving environment information, reference can be made to the relevant descriptions in step 203, the details are not repeatedly described herein.

S404: determining a risk level based on the remaining collision time duration, the stopping time duration and the preset risk level probability model.

The risk level is determined by this device based on the remaining collision time duration, the stopping time duration, the escape time duration and the preset risk level probability model, where the risk level includes a dangerous state, an attention reminding state and a safe state. In this embodiment, the risk level includes: 1) dangerous, 2) attention reminding, 3) safe, which are expressed by the formula listed as follows:

$\tau \in \{\text{Dangerous,Attentive,Safe}\} = \{D,A,S\}$

The risk level is merely a preliminary estimation of the current situation, which risk level the current situation falls within is estimated, and the risk level may be interpreted as acquiring a prior probability. The preset risk level probability model in this embodiment is configured to acquire the prior probability which is equivalent to the condition probability in the bayesian probability model.

S405, determining the target risk degree monitoring strategy based on the risk level, the remaining collision time duration and the stopping time duration.

Different risk levels correspond to different risk degree monitoring strategies, for example, the risk level indicating the dangerous state and the risk level indicating the safe state have different risk levels and different parameters that influence the risk level information, consequently, the risk degree monitoring strategies are certainly different.

In this embodiment, the same risk level is further distinguished by different conditions, the risk degree monitoring strategies corresponding to the various risk levels under different conditions are preset in this device. Particularly, regarding the risk degree monitoring strategies corresponding to the various risk levels under different conditions, reference can be made to the formulas listed as follows:

$$s_{o_j}\left(TTC_{o_j}^{CM}, v_{hv}^{CM}(t)|\tau = D\right) \propto \begin{cases} 1, & \text{if } TTC_{o_j}^{CM} \leq TTS_{a_e} \\ e^{-\frac{\left(TTC_{o_j}^{CM}-TTS_{a_e}\right)^2}{2\sigma^2}}, & \text{otherwise} \end{cases}$$

$$s_{o_j}\left(TTC_{o_j}^{CM}, v_{hv}^{CM}(t)|\tau = A\right) \propto e^{-\frac{\left(TTC_{o_j}^{CM}-TTS_{a_e}\right)^2}{2\sigma^2}}$$

$$s_{o_j}\left(TTC_{o_j}^{CM}, v_{hv}^{CM}(t)|\tau = S\right) \propto \begin{cases} e^{-\frac{\left(TTC_{o_j}^{CM}-TTS_{a_e}\right)^2}{2\sigma^2}}, & \text{if } TTC_{o_j}^{CM} \leq TTS_{a_e} \\ 1, & \text{otherwise} \end{cases}$$

$$\forall j = 1, 2, \ldots, N$$

Where, $s_{o_j}$ represents risk degree information of risk behavior, hv identifies the first vehicle, $o_j$ identifies the second vehicle, $\tau$ represents the risk level, D identifies the risk level as the dangerous state, A identifies the risk level as the attention reminding state, S identifies the risk level as the safe state, $TTC_{o_j}^{CM}$ represents collision time in a CM direction, $v_{hv}^{CM}(t)$ represents the speed of the first vehicle in the CM direction, where the CM direction is the direction of a connecting line that connects the point corresponding to the first vehicle with the point corresponding to the second vehicle.

S406, determining the risk degree information of driving behavior based on the target risk degree monitoring strategy.

Regarding the details of the step 406, reference can be made to the relevant descriptions in the step 2043, the step 406 is not repeatedly described herein.

In one embodiment, after the risk degree information of driving behavior is acquired, the risk degree information of driving behavior may be converted to the probability of risk degree through a softmax function, the probability of risk degree is calculated by the formula listed as follows:

$$P(\tau_{o_j}|TTC_{o_j}, v_{hv}(t)) = \frac{e^{s\left(TTC_{o_j}, v_{hv}(t)|\tau_{o_j}\right)}}{\sum_{\tau \in \{D,A,S\}} e^{s\left(TTC_{o_j}, v_{hv}(t)|\tau_{o_j}\right)}}$$

$$\tau_{o_j} \in \{D, A, S\}$$

For a designated second vehicle, the risk degree information of the second vehicle may be calculated by the formula listed as follows:

$$\tau_{o_\cdot} = \underset{\tau_{o_j}}{\arg\max} P(\tau_{o_\cdot}|TTC_{o_j}, v_{hv}(t))$$

$$\tau_{o_j} \in \{D, A, S\}$$

In the current region, the most dangerous vehicle and the corresponding risk degree of the most dangerous vehicle may be calculated by the formula listed as follows:

$$\delta = \underset{j}{\arg\max}(\tau_{o_j})$$

$$\Gamma = \tau_{o_\delta}$$

It should be understood that, value of serial number of the steps in the embodiment mentioned above doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

Figure 9:
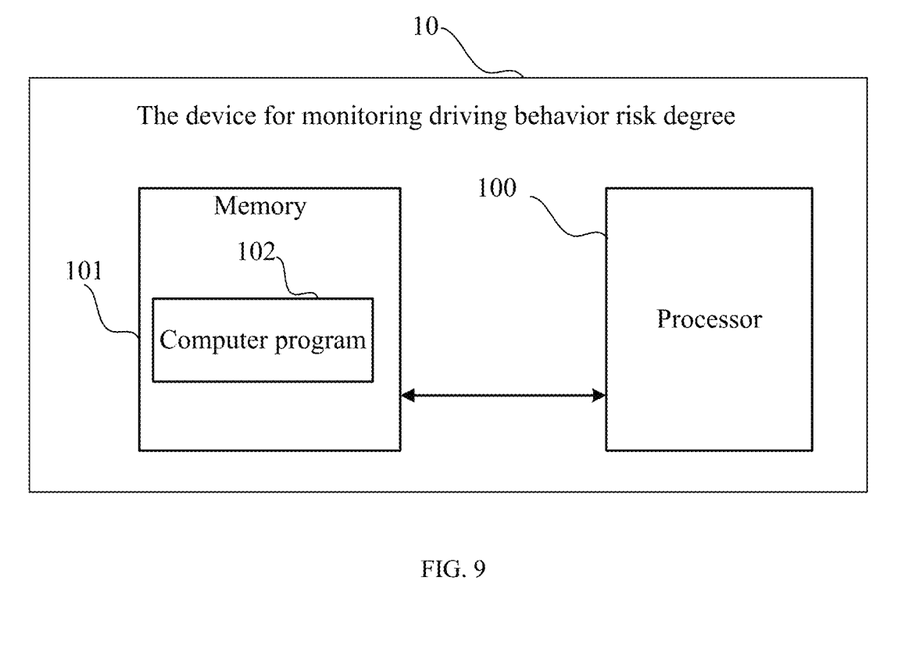
FIG. 9 depicts a schematic diagram of an apparatus for monitoring driving behavior risk degree according to the fifth embodiment of the present disclosure.

FIG. 9 depicts a schematic diagram of a device 10 for monitoring driving behavior risk degree provided by the sixth embodiment of the present disclosure. As shown in FIG. 9, the device 10 for monitoring driving behavior risk degree in this embodiment includes: a processor 100, a memory 101 and a computer program 102 stored in the memory 101 and executable by the processor 100 such as the procedure for monitoring driving behavior risk degree. The processor 100 is configured to implement the steps in the embodiment of the method for monitoring driving behavior risk degree when executing the computer program 102 such as the steps 101-103 shown in FIG. 1. As an alternative, the processor 100 is configured to implement the functions of the various modules/units in these device embodiments such as the functions of modules 911-930 when executing the computer program 102.

Exemplarily, the computer program 102 may be divided into one or a plurality of modules/units, the one or plurality of modules/units are stored in the memory 101, and are executed by the processor 100 so as to implement the present disclosure. The one or plurality of modules/units may be a series of computer program instruction segments that may accomplish particular functionalities, these instruction segments are used for describing an executive process of the computer program 102 in the device 10 for monitoring driving behavior risk degree.

In one embodiment, the processor 100 is configured to execute the computer program 102 in the memory 101 to implement steps of:

acquiring first vehicle size information of a first vehicle, acquiring second vehicle size information of a second vehicle, and acquiring vehicle driving information and vehicle driving environment information; the vehicle driving information includes driving speed information of the first vehicle and driving speed information of the second vehicle;

determining the number of overlapping regions of the first vehicle and the second vehicle based on the first vehicle size information, the second vehicle size information and the vehicle driving information; and determining risk degree information of driving behavior based on the number of overlapping regions, the vehicle driving information and the vehicle driving environment information.

In one embodiment, when the number of overlapping regions is 0, the processor 100 is further configured to execute the computer program 102 in the memory 101 to implement the steps of:

determining a remaining collision time duration and a stopping time duration based on the vehicle driving information and the vehicle driving environment information; where the remaining collision time duration is a remaining time duration lasting from the current moment to a time when the first vehicle collides with the second vehicle; the remaining collision time duration includes a first remaining collision time duration in a X-axis direction and a second remaining collision time duration in a Y-axis direction; the stopping time duration is a time duration lasting from the current moment to a moment when the first vehicle stops driving; and determining the risk degree information of the driving behavior based on the first remaining collision time duration, the second remaining collision time duration, the stopping time duration and a preset risk level probability model.

In one embodiment, the processor 100 is particularly configured to determine the risk degree information of the driving behavior based on the first remaining collision time duration, the second remaining collision time duration, the stopping time duration and a preset risk level probability model by:

determining a risk level based on the first remaining collision time duration, the second remaining collision time duration, the stopping time duration and a preset risk level probability model;

determining a target risk degree monitoring strategy based on the risk level, the first remaining collision time duration, the second remaining collision time duration and the stopping time duration; and determining the risk degree information of driving behavior based on the target risk degree monitoring strategy.

In one embodiment, the risk level includes a dangerous state, an attention reminding state and a safe state;

The processor 100 is particularly configured to determine a risk level based on the first remaining collision time duration, the second remaining collision time duration, the stopping time duration and a preset risk level probability mode by determining the risk level as the dangerous state, when an absolute value of a difference value between the first remaining collision time duration and the second remaining collision time duration is less than a preset threshold value; or determining the risk level as the safe state, when the absolute value of the difference value between the first remaining collision time duration and the second remaining collision time duration is greater than or equal to the preset threshold value; or determining the risk level based on the preset risk level probability model, when the absolute value of the difference value between the first remaining collision time duration and the second remaining collision time duration is greater than the preset threshold value or the remaining collision time duration is greater than the stopping time duration.

In one embodiment, when the number of overlapping regions is 1, the processor 100 is particularly configured to determine risk degree information of driving behavior based on the number of overlapping regions, the vehicle driving information and the vehicle driving environment information by determining the remaining collision time duration, the stopping time duration and the escape time duration based on the vehicle driving information and the vehicle driving environment information, where the escape time duration is a time duration lasting from the current time moment to a target moment, and the target moment is the moment when the overlapping regions between the first vehicle and the second vehicle disappears;

determining the risk level based on the remaining collision time duration, the stopping time duration, the escape time duration and the preset risk level probability model;

determining the target risk degree monitoring strategy based on the risk level, the remaining collision time duration, the stopping time duration and the escape time duration; and determining the risk degree information of driving behavior based on the target risk degree monitoring strategy.

In one embodiment, the processor 100 is particularly configured to determine the risk level based on the remaining collision time duration, the stopping time duration, the escape time duration and the preset risk level probability model by:

determining the risk level as the safe state when the escape time duration is greater than or equal to the remaining collision time duration; or determining the risk level based on the preset risk level probability model when the escape time duration is less than the remaining collision time duration.

In one embodiment, when the number of overlapping regions is 2, the processor 100 is particularly configured to determine risk degree information of driving behavior based on the number of overlapping regions, the vehicle driving information and the vehicle driving environment information by:

determining the remaining collision time duration and the stopping time duration according to the vehicle driving information and the vehicle driving environment information;

determining the risk level based on the remaining collision time duration, the stopping time duration and the preset risk level probability model;

determining the target risk degree monitoring strategy based on the risk level, the remaining collision time duration and the stopping time duration; and determining the risk degree information of driving behavior based on the target risk degree monitoring strategy.

The device 10 for monitoring driving behavior risk degree may include but is not limited to the processor 100 and the memory 101.

It should be understood for one of ordinary skill in the art that, FIG. 9 is merely an example of the device for monitoring driving behavior risk degree 10, and is not constituted as limitation to the device for monitoring driving behavior risk degree 10, more or less components shown in FIG. 9 may be included, or some components or different components may be combined; for example, the device for monitoring driving behavior risk degree may also include an input and output device, a network access device, a bus, etc.

The so called processor 100 may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor may also be any conventional processor and so on.

The memory 101 may be an internal storage unit of the device for monitoring driving behavior risk degree 10, such as a hard disk or a memory of the device for monitoring driving behavior risk degree 10. The memory 101 may also be an external storage device of the device for monitoring driving behavior risk degree 10, such as a plug-in hard disk, a SMC (Smart Media Card), a SD (Secure Digital) card, a FC (Flash Card) equipped on the device for monitoring driving behavior risk degree 10. Further, the memory 101 may not only include the internal storage unit of the device for monitoring driving behavior risk degree, but also include the external storage device of the device for monitoring driving behavior risk degree. The memory 101 is configured to store the computer program, and other procedures and data as required by the device for monitoring driving behavior risk degree 10. The memory 101 may also be configured to store data that has been output or being ready to be output temporarily.

It needs to be explained that since the contents including information interaction and execution process between the devices/units as mentioned above and the method embodiments of the present disclosure are based on the same concept, regarding the specific functions and the technical effects that are achieved, reference can be made to the part of method embodiments, they are not repeatedly described herein.

It can be clearly understood by the person of ordinary skill in the art that, for the convenience of describing and concisely, dividing of the aforesaid various functional units, functional modules is described exemplarily merely, in an actual application, the aforesaid functions can be assigned to different functional units and functional modules to be accomplished, that is, an inner structure of the device for monitoring driving behavior risk degree is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present disclosure. Regarding a specific working process of the units and modules in the aforesaid device, reference can be made to a corresponding process in the method embodiments mentioned above, the specific working process of the units and modules in the aforesaid device is not repeatedly described herein.

Embodiments of the present disclosure further provides a computer readable storage medium which stores computer program, the computer program is configured to implement the steps in the various method embodiments as mentioned above when being executed by a processor.

The embodiments of the present disclosure provide a computer program product, when the computer program product is executed by the mobile terminal, the mobile terminal is caused to perform the steps in the various method embodiments.

If the integrated unit is achieved in the form of software functional units, and is sold or used as an independent product, it can be stored in a computer readable storage medium. Based on this understanding, a whole or part of flow process of implementing the method in the aforesaid embodiments of the present disclosure can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium may at least include: any entity or device that can carry the computer program codes, recording medium, compute memory, ROM (Read-Only Memory), RAM (Random Access Memory), electrical carrier signal and telecommunication signal, software distribution medium, such as USB flash disk, mobile hard disk, hard disk, optical disk, etc. In some judicial districts, according to legislation and patent practice, the computer readable medium couldn't be the electrical carrier signal and the telecommunication signal.

In the embodiments of the present disclosure, the descriptions of the embodiments in the present disclosure are emphasized respectively, regarding the part in some embodiments which is not described or recorded in detail, reference can be made to related descriptions in other embodiments.

The person of ordinary skill in the art may be aware of that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The person of ordinary skill in the art could use different methods to implement the described functions for each particular application; however, such implementations should not be considered as going beyond the scope of the present disclosure.

It should be understood that, in the embodiments of the present disclosure, the disclosed device/terminal device and method may be implemented in other ways. For example, the device described above are merely illustrative; for example, the division of the units is only a logical function division, and other division could be used in the actual implementation, for example, multiple units or components could be combined or integrated into another system, or some features may be ignored or not performed. In another aspect, the coupling or direct coupling or communicating connection shown or discussed could be an indirect coupling or communicating connection through some interfaces, devices or units, and the coupling or direct coupling or communicating connection could be electrical, mechanical, or in other form.

The units described as separate components could or could not be physically separate, the components shown as units could or could not be physical units, which may be located in one place, or may be distributed to multiple network elements. A part or a whole of the elements could be selected according to the actual needs to achieve the objective of the present embodiment.

The aforesaid embodiments as mentioned above are only intended to explain but not to limit the technical solutions of the present disclosure. Although the present disclosure has been explained in detail with reference to the above-described embodiments, it should be understood by the ordinary skilled one in the art that, the technical solutions described in each of the embodiments mentioned above can still be amended, or some technical features in the technical solutions can be replaced equivalently; these amendments or equivalent replacements, which doesn't cause the essence of corresponding technical solution to be broken away from the spirit and the scope of the technical solution in various embodiments of the present disclosure, should all be included in the protection scope of the present disclosure.

The aforementioned embodiments are only selectable embodiments of the present disclosure, and should not be regarded as limitation to the present disclosure. For the person of ordinary skill in the art, various modifications and changes can be done in the present disclosure. Any modification, equivalent replacement, improvement, and the like, which are made within the spirit and the principle of the present disclosure, should all be included in the protection scope of the present disclosure.

What is claimed is:

1. A method for monitoring driving behavior risk degree, comprising:
   acquiring first vehicle size information of a first vehicle, acquiring second vehicle size information of a second vehicle, and acquiring vehicle driving information and vehicle driving environment information, wherein the vehicle driving information comprises driving speed information of the first vehicle and driving speed information of the second vehicle;
   determining a number of overlapping regions of the first vehicle and the second vehicle based on the first vehicle size information, the second vehicle size information, and the vehicle driving information; and
   determining risk degree information of driving behavior based on the number of overlapping regions, the vehicle driving information, and the vehicle driving environment information;
   wherein when the number of overlapping regions is 1, the step of determining the risk degree information of driving behavior comprises steps of:
   determining a remaining collision time duration, a stopping time duration and an escape time duration based on the vehicle driving information and the vehicle driving environment information, wherein the escape time duration is a time duration lasting from the current time moment to a target moment, and the target moment is a moment when the overlapping regions between the first vehicle and the second vehicle disappears;
   determining the risk level based on the remaining collision time duration, the stopping time duration and the escape time duration, or based on the preset risk level probability model;
   determining the target risk degree monitoring strategy based on the risk level, the remaining collision time duration, the stopping time duration and the escape time duration; and
   determining the risk degree information of driving behavior based on the target risk degree monitoring strategy;
   wherein the risk level comprises a dangerous state, an attention reminding state and a safe state, the step of determining the risk level based on the remaining collision time duration, the stopping time duration, the escape time duration, or based on the preset risk level probability model comprises steps of:
   determining the risk level as the safe state, when the escape time duration is greater than or equal to the remaining collision time duration; or
   determining the risk level based on the preset risk level probability model when the escape time duration is less than the remaining collision time duration;
   wherein the remaining collision time duration is a remaining time duration lasting from the current moment to a time point when the first vehicle collides with the second vehicle, the remaining collision time duration is calculated according to a formula listed below:

$$TTC = \frac{p_j(t) - p_i(t)}{v_i(t) - v_j(t)}$$

$$i = \mathrm{argmax}(v_{hv}(t), v_{oj}(t)), i \in \{hv, o_j\}$$

$$j = \mathrm{argmax}(v_{hv}(t), v_{oj}(t)), j \in \{hv, o_j\}$$

wherein TTC represents the remaining collision time duration, p represents current location information, v represents the driving speed information, Av represents the first vehicle, $o_j$ represents the second vehicle, t represents the current moment, j represents an index of other traffic participants;
the stopping time duration represents a time duration lasting from the current moment to a moment when the first vehicle stops driving; the stopping time duration is calculated according to a formula listed below:

$$TTS_{a_i}(v_{hv}(t), w_s) = \left\{ t \mid w_s \frac{v_{hv}(t)}{a_i}, i \in \{e, a, c\} \right\}$$

$$s \in = \{\text{clear, fog, rain, dust}\} = \{c, f, r, d\}$$

$$w_s = \{c{:}1, f{:}1.4, r{:}1.2, d{:}1.3\}$$

wherein TTS represents the stopping time duration, s represents driving environment weather information, clear, fog, rain, dust represents that the driving environment weather information are sunny weather, foggy weather, rainy weather and dusty weather, respectively, $w_s$ represents coefficients corresponding to different driving environment weather information, a represents deceleration information;
the escape time duration is calculated according to a formula listed below:

$$TTE_{o_j}^{x(y)} = \frac{p_i^{x(y)}(t) - p_j^{x(y)}(t) + l}{v_j^{x(y)}(t) - v_i^{x(y)}(t)}$$

wherein, l represents a half of a sum of lengths of the first vehicle and the second vehicle, $p^{x(y)}(t)$ represents location information in a X direction or in a Y direction, $v^{x(y)}(t)$ represents a velocity in the X direction or in the Y direction.

2. The method for monitoring driving behavior risk degree according to claim 1, wherein the step of determining the risk level based on the remaining collision time duration, the stopping time duration, the escape time duration and the preset risk level probability model comprises steps of:
   determining the risk level as the safe state, when the escape time duration is greater than or equal to the remaining collision time duration; or
   determining the risk level based on the preset risk level probability model when the escape time duration is less than the remaining collision time duration.

3. The method for monitoring driving behavior risk degree according to claim 1, wherein when the number of overlapping regions is 2, the step of determining risk degree information of driving behavior based on the number of overlapping regions, the vehicle driving information and the vehicle driving environment information comprises steps of:
  determining the remaining collision time duration and the stopping time duration according to the vehicle driving information and the vehicle driving environment information;
  determining the risk level based on the remaining collision time duration, the stopping time duration and the preset risk level probability model;
  determining the target risk degree monitoring strategy based on the risk level, the remaining collision time duration and the stopping time duration; and
  determining the risk degree information of driving behavior based on the target risk degree monitoring strategy.

4. A device for monitoring driving behavior risk degree, comprising: a memory, a processor and computer program stored in the memory and executable by the processor, the processor is configured to, when executing the computer program, implement the method for monitoring driving behavior risk degree according to claim 1.

5. A computer readable storage medium which stores a computer program, wherein the computer program is configured to, when being executed by a processor, implement the method according to claim 1.

* * * * *